(12) United States Patent
Straub et al.

(10) Patent No.: US 11,446,610 B2
(45) Date of Patent: Sep. 20, 2022

(54) GAS SEPARATION MEMBRANE MODULE WITH ENHANCED PERFORMANCE

(71) Applicant: Generan IGS, Inc., Houston, TX (US)

(72) Inventors: Marc Straub, Brentwood, CA (US); Robert Kociolek, Benicia, CA (US); Frederick L. Coan, Antioch, CA (US); Luis Brizuela, Antioch, CA (US)

(73) Assignee: Generon IGS, Inc., Houston, TX (US)

( * ) Notice: Subject to any disclaimer, the term of this patent is extended or adjusted under 35 U.S.C. 154(b) by 113 days.

(21) Appl. No.: 16/807,349

(22) Filed: Mar. 3, 2020

(65) Prior Publication Data
US 2020/0316527 A1    Oct. 8, 2020

Related U.S. Application Data (60) Provisional application No. 62/828,627, filed on Apr. 3, 2019.

(51) Int. Cl.
*B01D 53/22* (2006.01)
*B01D 63/06* (2006.01)
*B01D 63/02* (2006.01)
*B01D 61/22* (2006.01)

(52) U.S. Cl.
CPC ............. *B01D 63/06* (2013.01); *B01D 61/22* (2013.01); *B01D 63/02* (2013.01); *B01D 2053/224* (2013.01)

(58) Field of Classification Search
CPC .. B01D 2053/224; B01D 63/02; B01D 63/06; B01D 61/22
See application file for complete search history.

(56) References Cited

U.S. PATENT DOCUMENTS

| | | | | |
|---|---|---|---|---|
| 3,322,373 A | * | 5/1967 | Boyer | B65D 85/04 242/118.7 |
| 4,306,972 A | * | 12/1981 | Denti | B01D 63/02 210/321.81 |
| 4,881,953 A | | 11/1989 | Prasad | |
| 5,026,479 A | | 6/1991 | Bikson | |
| 5,137,631 A | | 8/1992 | Eckman | |
| 5,176,725 A | | 1/1993 | Puri | |
| 5,470,469 A | | 11/1995 | Eckman | |
| 7,338,601 B2 | * | 3/2008 | Schott | B01D 53/225 210/321.74 |
| 7,497,894 B2 | | 3/2009 | Jeffers | |
| 7,517,388 B2 | | 4/2009 | Jensvold | |
| 7,578,871 B2 | | 8/2009 | Jensvold | |

(Continued)

*Primary Examiner* — Anthony R Shumate
(74) *Attorney, Agent, or Firm* — William H. Eilberg (57) ABSTRACT

A gas separation module includes hollow polymeric fibers held between a pair of tubesheets. The tubesheets are mounted to a core tube, and the distance between the tubesheets is maintained constant. The core tube is formed in telescoping sections, such that the fibers are attached to the tubesheets when the core tube is in its extended position, and the core tube is then collapsed, forming slack in the fibers. The core tube includes two distinct channels, connected to receive permeate and retentate gas streams, and to carry these streams to outlet ports while keeping the streams separate. Because the tubesheets are affixed to the core tube, the tubesheets do not move under the influence of gas pressure in the module. The slack in the fibers compensates for shrinkage of the fibers, prolonging the life of the module.

6 Claims, 9 Drawing Sheets

(56) References Cited

U.S. PATENT DOCUMENTS

| | | |
|---|---|---|
| 7,662,333 B2 | 2/2010 | Coan |
| 2010/0024649 A1* | 2/2010 | Semmere ............... B64D 37/32 96/8 |
| 2014/0230649 A1 | 8/2014 | Cao |
| 2015/0053085 A1 | 2/2015 | Mahley |
| 2015/0174533 A1* | 6/2015 | Li ........................ B01D 63/022 95/45 |
| 2015/0290875 A1* | 10/2015 | Mark .................... B29C 64/106 264/138 |
| 2016/0023164 A1* | 1/2016 | Karode ............... B01D 53/227 96/8 |
| 2016/0303507 A1* | 10/2016 | Jensvold ............. B01D 53/229 |
| 2017/0113181 A1* | 4/2017 | Sinstedten ........... B01D 53/268 |
| 2017/0348640 A1* | 12/2017 | Suganuma ......... B01D 19/0031 |
| 2018/0078907 A1* | 3/2018 | Yoshimune ............... D01F 9/24 |
| 2018/0221824 A1* | 8/2018 | Visser .................. B01D 63/046 |
| 2019/0022599 A1* | 1/2019 | Takeuchi ............. D06N 3/0056 |

* cited by examiner

FIG. 1

SHELL-SIDE FEED, ONE END

SHELL-SIDE FEED, ONE END
CORE TUBE EXTENDED ("UNCOLLAPSED")
FIG. 3A

CORE TUBE COLLAPSED
FIG. 3B

FIG. 4

SHELL-SIDE FEED, BOTH ENDS

BORE-SIDE FEED

GAS SEPARATION MEMBRANE MODULE WITH ENHANCED PERFORMANCE

CROSS-REFERENCE TO RELATED APPLICATION

Priority is claimed from U.S. provisional patent application Ser. No. 62/828,627, filed Apr. 3, 2019, the entire disclosure of which is hereby incorporated herein.

BACKGROUND OF THE INVENTION

The present invention relates to the separation of gas into components using polymeric membranes.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation of a typical gas separation membrane module, a gas is introduced into the module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 5,137,631, 5,470,469, 7,497,894, 7,517,388, 7,578,871, and 7,662,333, the disclosures of which are all hereby incorporated by reference.

One application of the above-described technology is the production of nitrogen by using air as the feed gas. If it is desired to produce nitrogen having high purity, i.e. having a purity of up to 99.99%, it is known to arrange two or more membrane modules in series. An output stream of a first module is used as the feed gas, or input stream, for a second module. In general, two membrane modules connected in series will yield a product which is substantially more pure than the output of just one module.

In providing a plurality of membrane modules, the modules can be arranged horizontally, i.e. side by side, or they can be stacked vertically. In general, a vertical configuration is desirable when the available space is limited, such as on off-shore oil drilling platforms.

One problem with the use of polymeric fiber membranes is their durability. One or more components of the feed gas may dissolve into the polymeric structure, and thereby reduce the glass transition temperature ($T_g$) of the polymer. Then, the polymer begins to soften, or plasticize. When the fiber, which is already very porous, becomes plasticized, the pores of the fiber collapse, leading to shrinkage of the fiber. Plasticization may occur when a polymeric fiber is exposed to acid gas atmospheres containing large concentrations of heavy hydrocarbons and aromatic components.

Over time, the deformation and shrinkage of the fiber due to plasticization leads to stress on the fiber, and possibly breakage. This shrinkage of the fiber therefore inhibits the performance of the membrane module, and reduces its useful life. Shrinkage of the fibers also puts stress on the tubesheets anchoring the fibers, causing cracks in the tubesheets.

Another problem with fiber membrane modules relates to the pressure exerted on the tubesheets. The feed gas is introduced into the module at a pressure which is greater than atmospheric pressure, to provide motive force for the gas. But the tubesheets must then withstand the elevated pressure inside the module. If the tubesheets are pushed outwardly by the pressure of the gas in the vessel, the fibers may become stretched, to the point that they break. Thus, outward movement of the tubesheets harms the performance of the module.

The present invention provides an improved fiber membrane module which solves the problems described above. The module of the present invention may be used in a single stage unit or a multiple stage unit, and can be used in either horizontal or vertical membrane configurations.

SUMMARY OF THE INVENTION

The present invention comprises a module containing a plurality of polymeric fibers for use in gas separation. The fibers extend between two tubesheets, the tubesheets being held by a pair of heads. A core tube extends along the length of the module. The heads are securely mounted on the core tube. The heads therefore stabilize the tubesheets, preventing the tubesheets from moving due to elevated gas pressure within the module.

In one important feature of the invention, the core tube is constructed so that it can telescope. That is, the core tube includes sections which enable the core tube to be extended or collapsed. In assembling the module, the ends of the fibers are affixed to the respective tubesheets while the core tube is in its extended position. Then, before the module is installed inside a casing, the core tube is collapsed, thereby creating slack in the fibers. This slack compensates for possible shrinkage of the fibers during operation of the module, and therefore tends to prevent damage to the fibers due to shrinkage. This technique thus substantially extends the life of the module. The process of collapsing the core tube is normally performed only once, during the assembly of the module.

The invention can be practiced with a module having shell-side feed or bore-side feed. The core tube is formed of two concentric cylinders, so that the core tube defines two distinct passages for gas. The two cylinders are denoted as the inner core tube and the outer core tube. The first passage, defined by the inner core tube, has a circular cross-section. The second passage comprises the space between the inner and outer core tubes, and has an annular cross-section. In general the two separate passages make it possible to direct permeate and retentate gas through distinct desired paths. Part of the invention resides in the specific configuration of gas flow paths within the modules.

The module of the invention can be used singly, or it can be used as part of a plurality of modules arranged in series. Also, a plurality of modules made according to the invention can be disposed within a single module housing.

The present invention therefore has the primary object of improving the efficiency and longevity of a gas-separation module having polymeric fibers.

The invention has the further object of preventing degradation of polymeric fibers due to shrinkage and/or plasticization.

The invention has the further object of enhancing the operation of a fiber membrane module, by preventing movement of tubesheets within the module, due to pressure of gas within the module.

The invention has the further object of providing a fiber membrane module having a core tube defining a plurality of distinct passages for gas, to direct distinct gaseous components to different locations within the module.

The reader skilled in the art will recognize other objects and advantages of the present invention, from a reading of the following brief description of the drawings, and the detailed description of the invention.

DETAILED DESCRIPTION OF THE INVENTION

Figure 1:
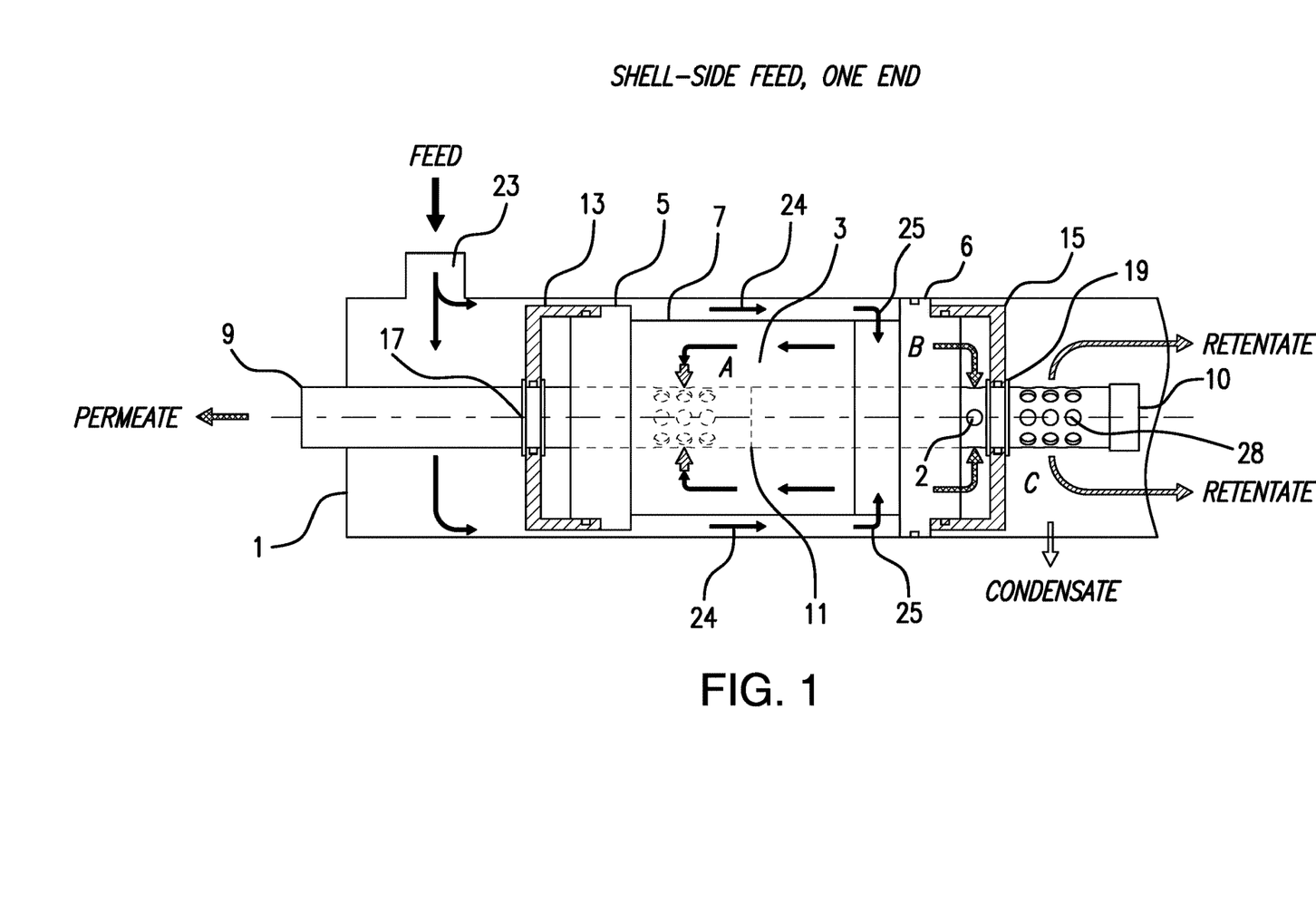
FIG. 1 provides a partly schematic, longitudinal cross-sectional view of a membrane module, made according to the present invention, wherein the feed gas is introduced on the shell side, at one end of the fibers.

FIG. 1 illustrates an embodiment of the present invention, wherein the feed gas is introduced from the shell side of the fibers, and at one end only.

The module is defined by a casing 1 which contains the fibers. The fibers are not shown explicitly, as in practice they are numerous and of very tiny diameter, but they are located in the region designated by reference numeral 3. The fibers are held between tubesheets 5 and 6. If the module is arranged vertically, the tubesheets may be identified as "upper" and "lower". For example, tubesheet 6 may be called the "upper" tubesheet. A gas impermeable baffle 7, preferably formed of a flexible plastic material, surrounds the fiber bundle, and prevents incoming gas from entering except where desired.

A core tube 9 extends longitudinally along the length of the module. The core tube, which is also illustrated in the cross-sectional views of FIGS. 2a-2c, includes two coaxial tubes, namely an outer tube and an inner tube. The inner tube defines a channel for gas flow, the channel having a circular cross-section, and the outer and inner tubes together define a channel for gas flow having an annular cross-section.

The fibers are therefore located in the region between the outer core tube and the baffle 7.

The core tube is formed in sections so that the core tube can telescope. That is, the core tube can be extended and collapsed, as will be described in more detail later. In the view of FIG. 1, the sections of the core tube have been collapsed, so the sections abut each other along seam 11.

A pair of heads 13 and 15 are affixed to the core tube, and provide support for the tubesheets 5 and 6. The heads are preferably made of metal, or other relatively rigid material. The heads are securely held to the core tube 9 by retaining rings 17 and 19. The retaining rings maintain the heads in a constant longitudinal position along the core tube 9, and thus maintain a constant distance between the opposing tubesheets. As shown in the drawing, each head engages its associated tubesheet, and because the head is anchored to the core tube, the head prevents the tubesheet from moving outwardly (i.e. to the left, for tubesheet 5, and to the right, for tubesheet 6) due to the pressure of gas introduced into the interior of the module. Preventing such outward motion of the tubesheets prevents undue stretching of the fibers, the ends of which are connected to the respective tubesheets.

Figure 2A:
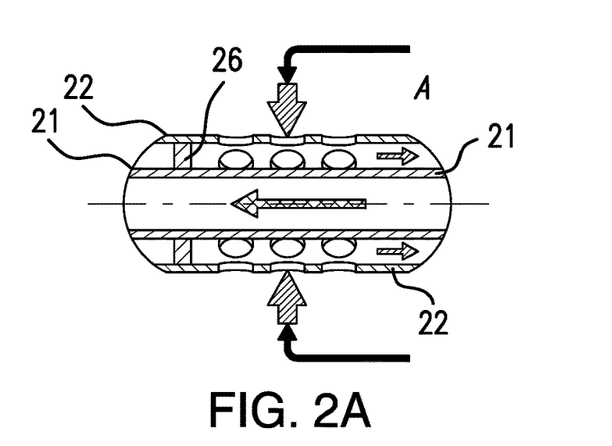
FIGS. 2a, 2b, and 2c provide cross-sectional views of the core tube of the embodiment of FIG. 1, corresponding, respectively, to the areas of FIG. 1 labeled A, B, and C.
Figure 2B:
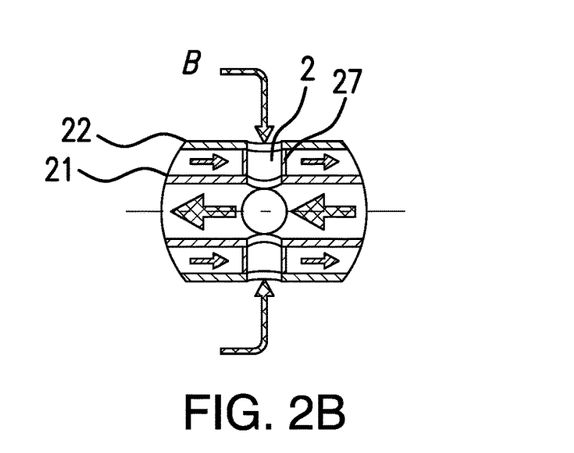
Figure 2C:
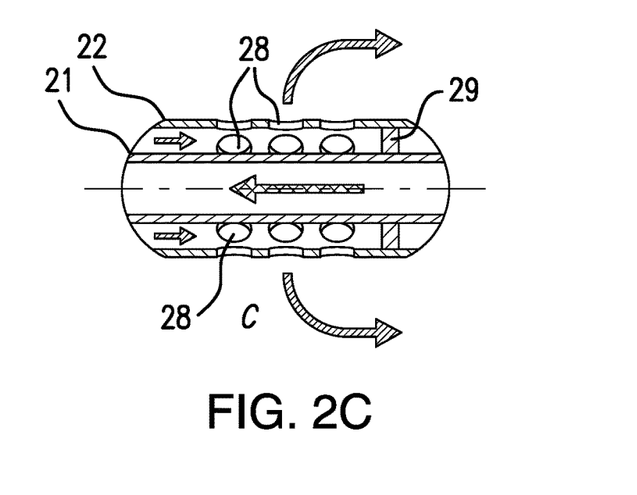

The internal structure of the core tube is further shown in FIGS. 2a-2c, which correspond, respectively, to the areas identified as A, B, and C in FIG. 1.

As shown, for example, in FIG. 2a, there is an inner core tube 21, and an outer core tube 22, the core tubes 21 and 22 both being cylindrical, and being coaxial. The cross-section of the inner core tube is therefore circular, and the cross-section of the channel through which gas flows in the outer core tube is annular.

Feed gas enters the module at port 23, of FIG. 1, travels along the periphery of the module, as indicated by arrows 24, and then flows radially inward, as indicated by arrows 25. The flow is dictated by the arrangement of baffles and walls in the module; the feed gas is pressurized, and it flows where it finds an available path.

Gas which permeates the fibers passes through the tubesheet first, and then enters the space between the tubesheet and its associated head, as indicated by reference symbol B in FIG. 1. The permeate then passes through hole 2 in the core tube. Hole 2 is a specially machined part.

FIG. 2b shows that the permeate gas is separated, by wall 27, from the channel of the outer core tube. Thus, the permeate gas flows only into the inner core tube, without leaking into the annular space defining the outer core tube. The permeate then flows to the left in the drawings, due to end cap 10, which seals off the right-hand end of the core tube. Thus, the permeate gas cannot flow to the right, and must flow to the left, as seen in FIGS. 1 and 2a-2c.

The retentate gas, i.e. gas which has not permeated the fibers, is directed to the outer core tube, as shown in FIG. 2a, and flows to the right in the figures, due to the presence of wall 26. This flow of retentate gas is independent of the flow of the permeate gas, as the permeate and retentate streams flow in separate and distinct channels within the core tube. Due to the structure of the core tube, the permeate and retentate streams do not mix.

Therefore, the permeate gas exits the module at the left-hand side of FIG. 1, and the retentate gas exits at the right-hand side. The retentate gas is forced out of holes 28 due to the effect of wall 29, shown in FIG. 2c. The end of the inner core tube, at the left-hand side of the drawing of FIG. 1, comprises an outlet port for permeate gas, and the holes 28 (see FIG. 2C) in the outer core tube comprise an outlet port for retentate gas.

In FIG. 2C, holes 28 are disposed around the surface of the outer core tube 22, as is also illustrated in FIG. 1. Similar dispositions of analogous holes are shown in the other cross-sectional views of the core tube, described below.

As mentioned above, the core tube is designed to telescope. That is, the core tube can be extended or collapsed, such that the overall length of the core tube can change. This feature is illustrated in FIGS. 3a and 3b.

Figure 3A:
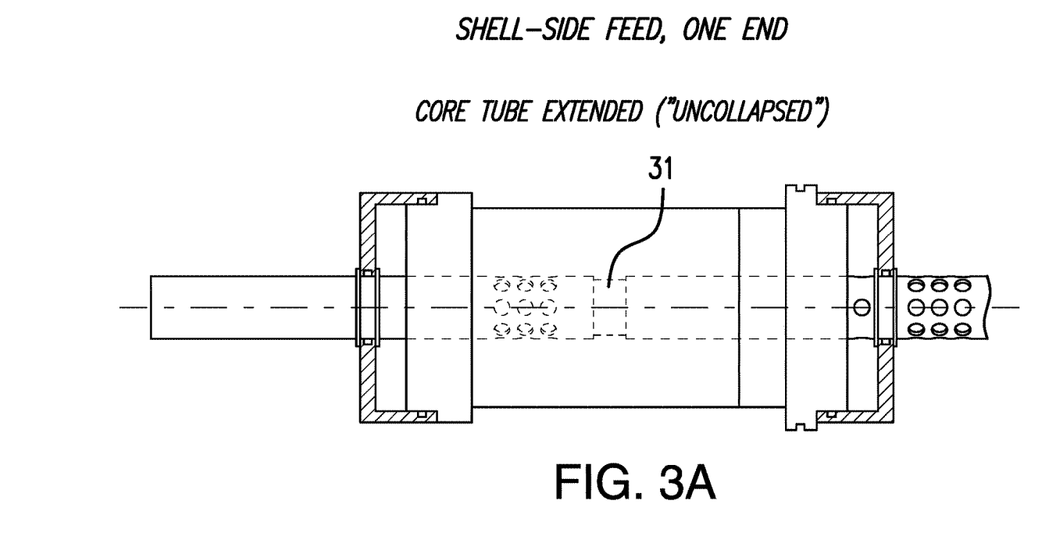
FIGS. 3a and 3b provide simplified drawings of the module of FIG. 1, wherein the core tube is extended, in FIG. 3a, and collapsed, in FIG. 3b.
Figure 3B:
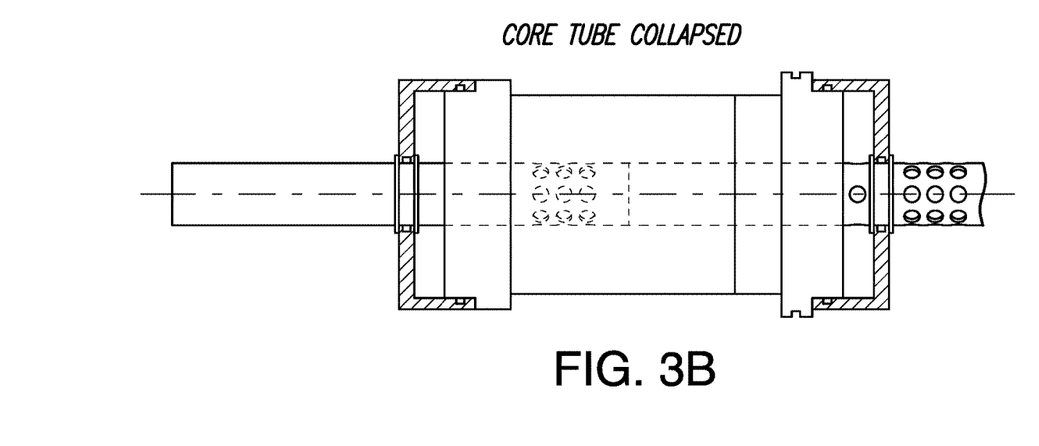

When the module is being assembled, one adjusts the core tube so that it is in the extended position, as shown in FIG. 3a. FIG. 3a shows core tube section 31 which is exposed when the core tube is in the extended position. Then, the fibers are attached, such that they extend from one tubesheet to the other. After the fibers have been attached to the tubesheets, the core tube is collapsed, as shown in FIG. 3b. Collapsing the core tube creates slack in the fibers. Thereafter, the core tube is maintained in the collapsed position, and the module is installed inside the casing.

Thus, the length of the core tube is normally adjusted only once, during the assembly process. The core tube is extended before the fibers are attached to the tubesheets, and collapsed after the fibers have been attached to the tubesheets, but before the module has been installed inside its casing.

The above-described process reduces or eliminates damage to the fibers due to shrinkage. Because there is some slack in the fibers, shrinkage of the fibers is not likely to cause damage, because the fibers will not be stretched excessively.

The telescoping feature of the core tube is separate from the dual structure of the core tube. That is, the core tube is constructed such that both the inner and outer tubes move together when the core tube is moved between the fully extended or fully collapsed positions.

Figure 4:
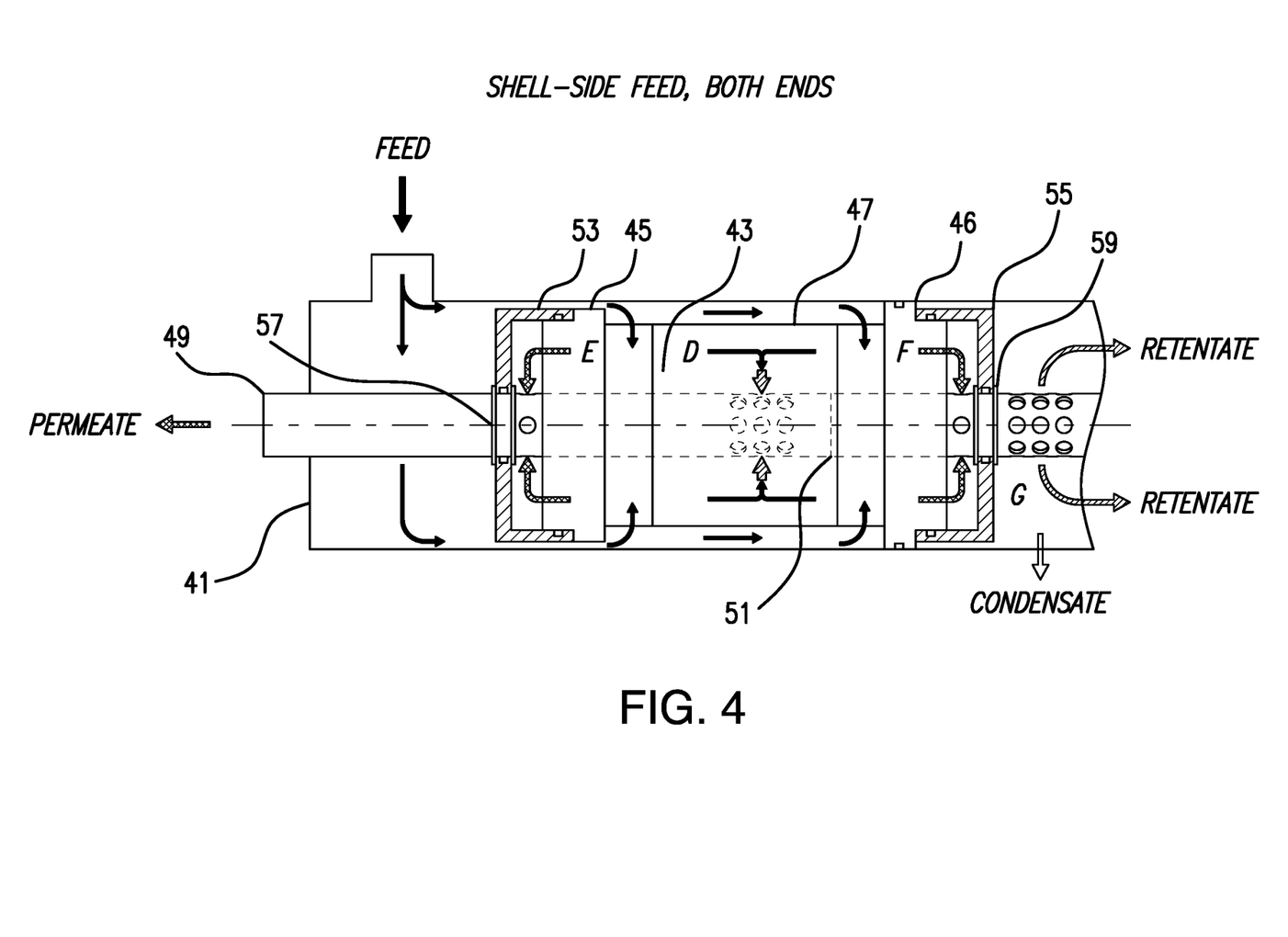
FIG. 4 provides a partly schematic, longitudinal cross-sectional view of a membrane module, made according to the present invention, wherein the feed gas is introduced on the shell side, at both ends of the fibers.

FIG. 4 shows an embodiment in which the feed gas is introduced on the shell side, and at both ends of the fibers.

The module of FIG. 4 is similar to that of FIG. 1 with respect to the following components. The module of FIG. 4 includes casing 41 holding fibers located in region 43, between tubesheets 45 and 46. The feed gas initially travels along the periphery of the fiber bundle due to gas impermeable baffle 47. A core tube 49 extends along the length of the module, the core tube being shown in its collapsed state, so that its sections abut each other along seam 51. Heads 53 and 55 are anchored to the core tube by retaining rings 57 and 59.

The core tube 49 is similar in construction to that of core tube 9 of FIG. 1. The cross-sectional views of FIGS. 5a-5d correspond to locations D, E, F, and G, respectively, of FIG. 4.

Figure 5A:
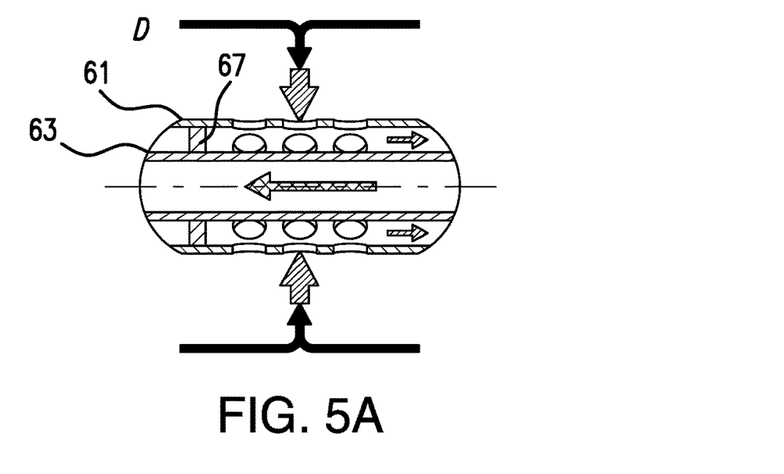
FIGS. 5a, 5b, 5c, and 5d provide cross-sectional views of the core tube of the embodiment of FIG. 4, corresponding, respectively, to the areas of FIG. 4 labeled D, E, F, and G.
Figure 5B:
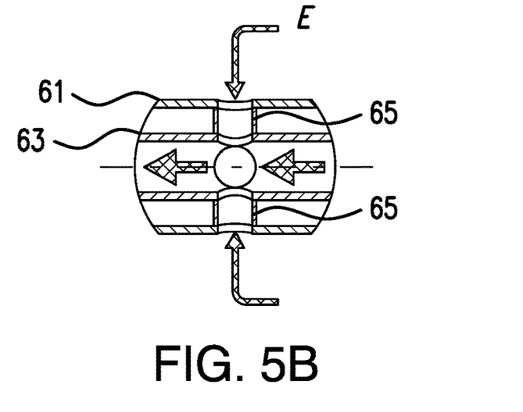
Figure 5C:
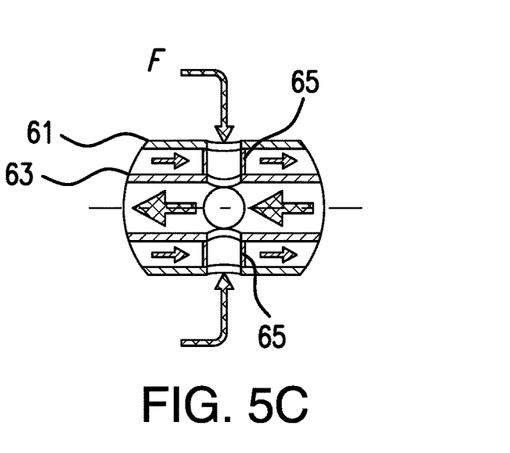
Figure 5D:
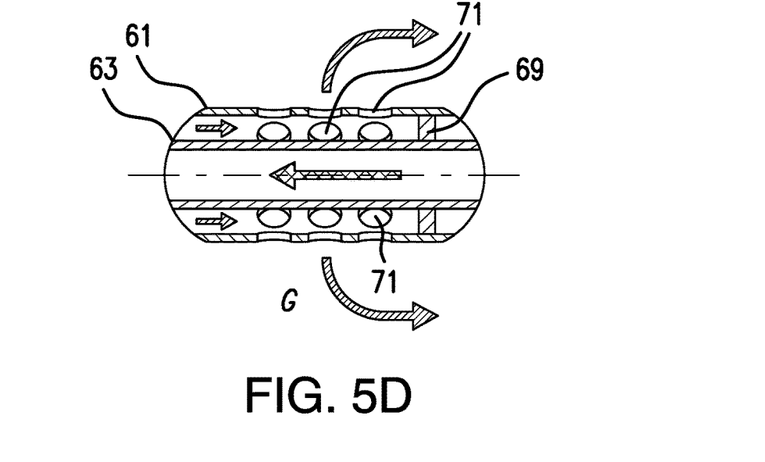
Figure 6A:
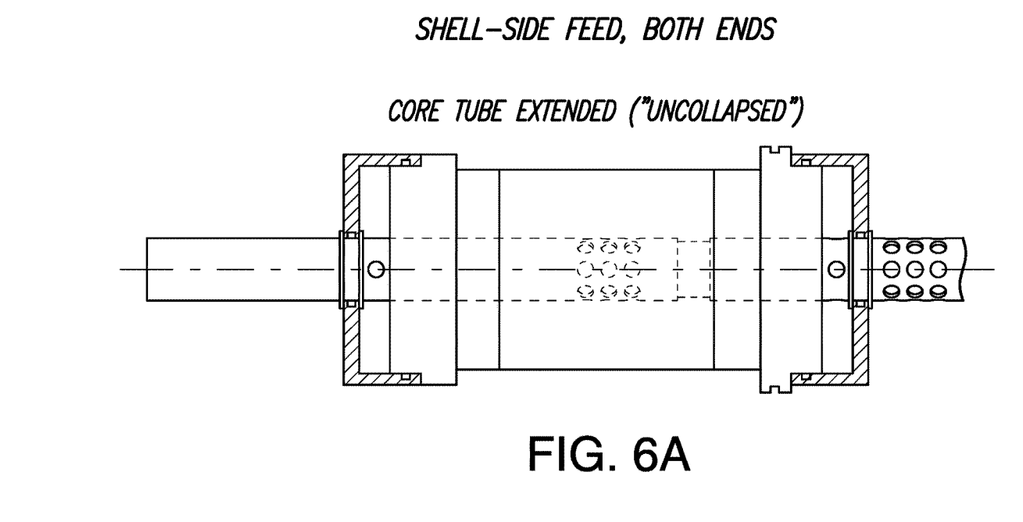
FIGS. 6a and 6b provide simplified drawings of the module of FIG. 4, wherein the core tube is extended, in FIG. 6a, and collapsed, in FIG. 6b.
Figure 6B:
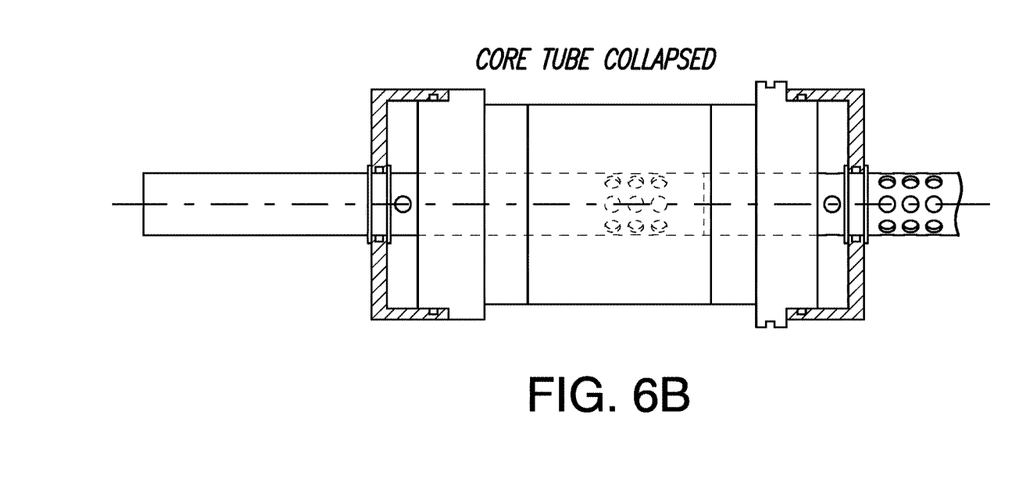

The core tube 49 is constructed to telescope, as illustrated in FIGS. 6a and 6b, similar to the previous embodiment. As shown in FIGS. 5a-5d, the core tube includes outer tube 61 and inner tube 63.

In the embodiment of FIG. 4, the feed gas is introduced at both ends of the fibers. Permeate gas enters the inner core tube at locations E and F, as illustrated in more detail in FIGS. 5b and 5c. These figures show that the permeate gas is separated, by wall 65, from the channel of the outer core tube. Thus, the permeate gas flows only into the inner core tube, where it flows to the left in the drawings, due to an end cap, not shown in FIG. 4 but similar to the end cap 10 of FIG. 1, preventing permeate gas from flowing to the right.

The retentate gas enters the outer core tube at location D, as further illustrated in FIG. 5a. Due to wall 67, the retentate gas must flow to the right, in the outer channel, as shown in the drawings.

FIG. 5d is similar to FIG. 2c of the previous embodiment. Due to wall 69, the retentate gas must exit through holes 71, disposed around the surface of the outer core tube.

FIGS. 6a and 6b show the module with the core tube extended and collapsed, in the embodiment of FIG. 4. The movement of the telescoping core tube is the same as in the embodiment of FIGS. 1-3.

Figure 7:
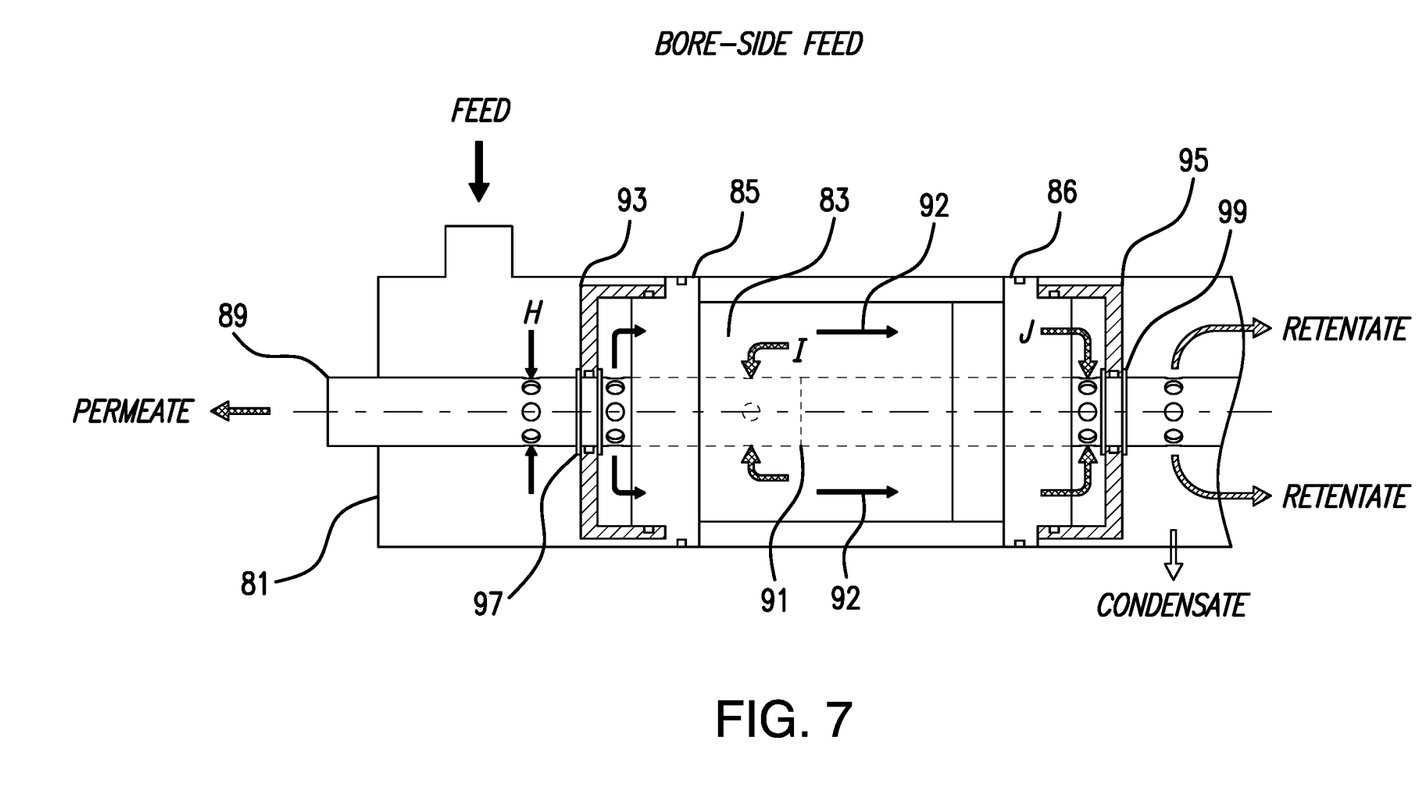
FIG. 7 provides a partly schematic, longitudinal cross-sectional view of a membrane module, made according to the present invention, wherein the feed gas is introduced on the bore side of the fibers.

FIG. 7 shows an embodiment in which the feed gas is introduced on the bore side of the fibers.

The module of FIG. 7 is similar to those of the previous embodiments with respect to the following components. The module of FIG. 7 includes casing 81 holding fibers located in region 83, between tubesheets 85 and 86. A core tube 89 extends along the length of the module, the core tube being shown in its collapsed state, so that its sections abut each other along seam 91. Heads 93 and 95 are anchored to the core tube by retaining rings 97 and 99.

The core tube 89 is similar in construction to that of core tube 9 of FIG. 1. The cross-sectional views of FIGS. 8a-8c correspond to locations H, I, and J, respectively, of FIG. 7.

Figure 8A:
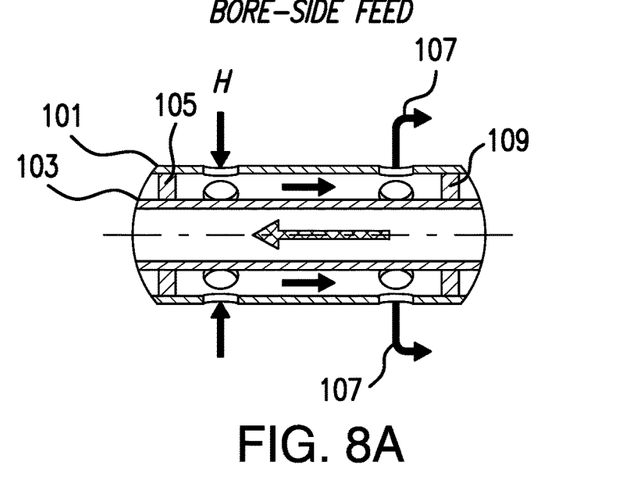
FIGS. 8a, 8b, and 8c provide cross-sectional views of the core tube of the embodiment of FIG. 7, corresponding, respectively, to the areas of FIG. 7 labeled H, I, and J.
Figure 8B:
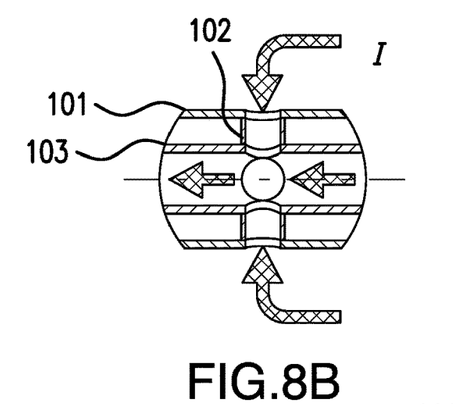
Figure 8C:
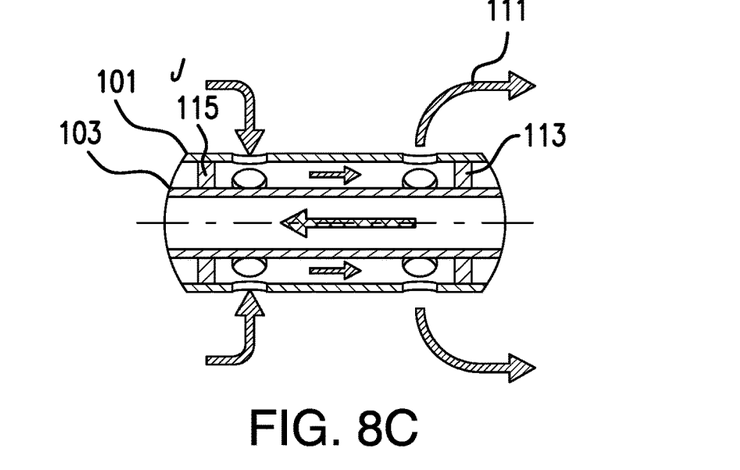
Figure 9A:
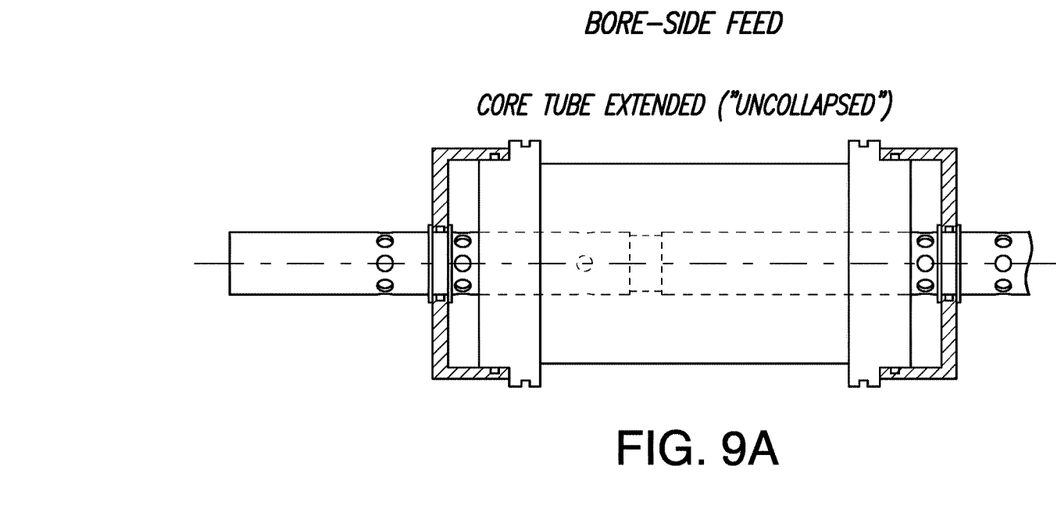
FIGS. 9a and 9b provide simplified drawings of the module of FIG. 7, wherein the core tube is extended, in FIG. 9a, and collapsed, in FIG. 9b.
Figure 9B:
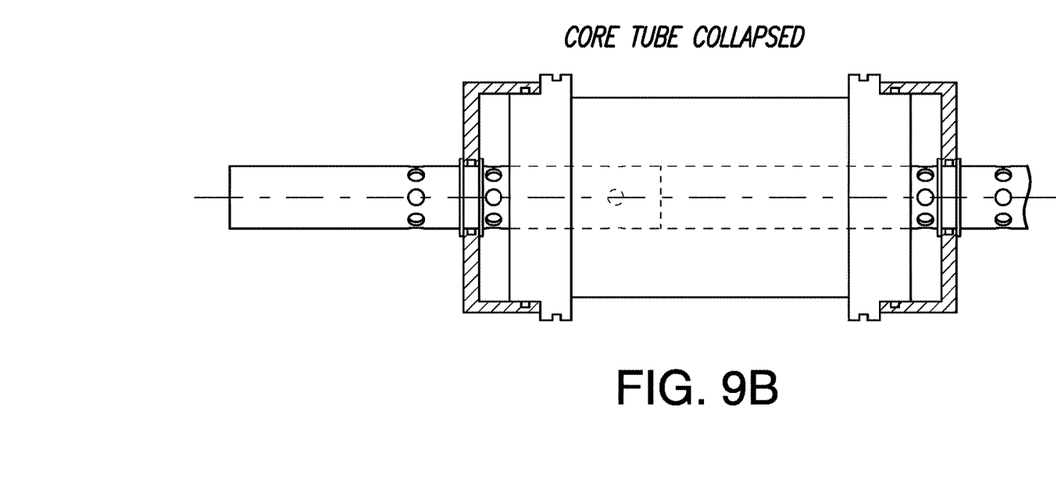

The core tube 89 is constructed to telescope, as illustrated in FIGS. 9a and 9b. As shown in FIGS. 8a-8c, the core tube includes outer tube 101 and inner tube 103.

In the embodiment of FIG. 7, the feed gas flows into the outer core tube 101, as shown in FIG. 8a, at the position labeled H in FIG. 7. The feed gas travels through the annular outer channel of the core tube, to the right as shown in the drawings, due to the effect of wall 105. The feed gas then exits the annular region as indicated by arrows 107, due to the effect of wall 109. The feed gas exits the annular region in the space between the head 93 and the tubesheet 85.

The feed gas then enters the fiber bundle, flowing into the open ends of the individual fibers. The feed gas flows to the right, as indicated by arrows 92 of FIG. 7, and some of the feed gas permeates through the walls of the fibers. This permeate gas flows into the center core tube at the location labeled I in FIG. 7, and shown in detail in FIG. 8b. The permeate gas does not leak into the outer core tube, due to the presence of wall 102, and instead flows directly into the inner core tube. The permeate gas then flows to the left, due to the presence of an end cap, similar to end cap 10 of FIG. 1, preventing the permeate from flowing to the right.

At the right-hand side of the fiber bundle, at the location labeled J in FIG. 7, the feed gas has become retentate, because it has not permeated the fibers. This retentate gas re-enters the outer core tube, traveling through the annular region, as shown in FIG. 8c, and then out of the core tube, as indicated by arrow 111. The retentate flows in this way, due to the effect of walls 113 and 115, shown in FIG. 8c.

FIGS. 9a and 9b show the module with the core tube extended and collapsed, in the embodiment of FIG. 7. The movement of the telescoping core tube is the same as in the previous embodiments.

The collapsing of the core tube is a process that is normally performed only once, during the assembly of the module. That is, the fibers are attached between tubesheets, and the core tube is collapsed, to provide slack in the fibers. The module is then installed inside the casing.

The collapsed position of the core tube is maintained permanently, preferably by a threaded connection. After the core tube has been collapsed, pieces of the core tube are threaded together, so that the sections remain in the collapsed position. Other means for maintaining the core tube in the collapsed position could be used instead, and the invention is not limited to the specific means used. It is not intended that the core tube be extended again, during the life of the module.

For convenience of illustration, caps similar to cap 10 of FIG. 1 are not shown in FIGS. 4 and 7. But it should be understood that such caps, or their equivalents, will be used in all embodiments, to insure that the permeate gas flows in the desired direction.

The present invention comprises at least the following three inventive features:

1) the telescoping core tube, which provides slack in the fibers, and therefore prevents damage to the fibers due to shrinkage;

2) the heads which are attached to the core tube, and which support the tubesheets, preventing the tubesheets from moving under the influence of elevated pressure inside the module, and thus preventing undue stretching of the fibers; and 3) the specific gas flows in the various embodiments, especially the distinct channels within the core tube, which permit the separate handling of permeate and retentate flows, as described above.

Prior art gas-separation systems have used flat sheets of polymeric material, the sheets being spirally wound. A membrane module which uses fibers, instead of spiral wound flat sheets, is advantageous due to the fact that fibers provide a greater effective membrane surface area than that provided by flat sheets, and a fiber design makes it easier to provide cross-flow and counter-current flow patterns.

Flat sheet membranes are subject to the same problems regarding shrinkage as described with respect to fiber membranes. But there is no known way to address this problem when using flat sheet membranes.

By enhancing the performance of polymeric fibers, when used as membranes for gas separation, the present invention makes fiber modules even more advantageous than flat sheet modules. The present invention makes fiber modules more practical and economical.

The membrane module of the present invention, when used with the shell-side feed configuration, may conveniently operate at pressures between about 40 bar and 100 bar. When used with a bore-side configuration, the module can conveniently operate at pressures between about 5 and 50 bar.

The modules of the present invention can comprise replacements for existing modules, without the need to alter the existing ports on the module housings. The modules may allow cross-flow or counter-current flow, depending on the needs of a particular application. Also, a plurality of modules made according to the present invention may be arranged within a single pressure vessel, limited only by the size of the outer housing and considerations regarding pressure drop.

Preferred materials for use as the membrane material include the sulfone class of polymers, including polysulfone, polyethersulfone, sulfonated polysulfone, and polyphenylsulfone. These materials are preferred polymers for the hollow fiber membranes because of their membrane durability, i.e. resilience to chemical contamination and plasticization, and their mechanical properties, i.e. high tensile and ultimate elongation properties. Other materials which can be used for the membranes include cellulosic and polyimide polymer families, and polycarbonates. But the invention is not necessarily limited to use of the polymers specifically listed above.

The invention can be modified in various ways, which will be apparent to those skilled in the art. Such modifications should be considered within the spirit and scope of the following claims.

What is claimed is:

1. A gas separation module, comprising:
a plurality of hollow fibers, held within a generally cylindrical casing having a longitudinal axis, the fibers being made of a polymeric material capable of separating a gas into components,
the fibers being held by a pair of tubesheets,
a core tube extending along the longitudinal axis of the casing, the core tube being constructed with telescoping sections,
the tubesheets being affixed to the core tube, wherein the tubesheets are held at a constant distance from each other,
wherein the tubesheets are positioned such that there is slack in the fibers,
wherein the core tube defines two distinct channels for gas flow, wherein gas in one of said channels does not mix with gas in another of said channels.

2. The gas separation module of claim 1, wherein the tubesheets are affixed to the core tube through a pair of heads, each tubesheet being connected to one of said pair of heads, and the heads being affixed to the core tube.

3. The gas separation module of claim 1, wherein the core tube comprises an outer tube and an inner tube, the outer and inner tubes being coaxial, wherein one of said channels is defined by a space within the inner tube, and wherein another of said channels is defined by a space between the outer tube and the inner tube.

4. The gas separation module of claim 3, wherein the core tube includes an end cap located at one end of the core tube, the core tube also including at least one opening communicating with one of said channels, and wherein gas flowing in the other of said channels exits the module at an end opposite to that of the end cap.

5. The gas separation module of claim 1, wherein the module produces a permeate stream comprising gas which has permeated the fibers, and a retentate stream comprising gas which has not permeated the fibers, and wherein the permeate stream can flow only into one of said channels, and the retentate stream can flow only into another of said channels, wherein the permeate and retentate streams do not mix.

6. The improvement of claim 5, wherein the permeate stream flows in the channel defined by the inner tube, and wherein the retentate stream flows in the channel defined by the inner and outer tubes, and wherein the module includes outlet ports for withdrawing the permeate and retentate streams at opposite ends of the module.

* * * * *